United States Patent [19]

Kulawiec

[11] Patent Number: 5,909,282
[45] Date of Patent: Jun. 1, 1999

[54] INTERFEROMETER FOR MEASURING THICKNESS VARIATIONS OF SEMICONDUCTOR WAFERS

[75] Inventor: Andrew W. Kulawiec, Fairport, N.Y.

[73] Assignee: Tropel Corporation, Fairport, N.Y.

[21] Appl. No.: 08/866,540

[22] Filed: May 30, 1997

Related U.S. Application Data

[60] Provisional application No. 60/018,769, May 31, 1996.
[51] Int. Cl.$^6$ ...................................................... G01B 9/02
[52] U.S. Cl. .......................... 356/355; 356/357; 356/360
[58] Field of Search .................................. 356/357, 359, 356/360, 355

[56] References Cited

U.S. PATENT DOCUMENTS

| | | |
|---|---|---|
| 2,518,647 | 8/1950 | Teeple et al. . |
| 3,735,036 | 5/1973 | Macouski . |
| 4,254,337 | 3/1981 | Yasujima et al. . |
| 4,653,922 | 3/1987 | Järisch et al. . |
| 5,386,119 | 1/1995 | Ledger . |
| 5,471,303 | 11/1995 | Ai et al. . |
| 5,502,564 | 3/1996 | Ledger . |
| 5,513,553 | 5/1996 | Wheeler et al. ........................ 356/355 |
| 5,515,167 | 5/1996 | Ledger et al. . |
| 5,523,840 | 6/1996 | Nishizawa et al. . |
| 5,555,087 | 9/1996 | Miyagawa et al. . |
| 5,555,471 | 9/1996 | Xu et al. . |
| 5,555,472 | 9/1996 | Clapis et al. . |
| 5,587,792 | 12/1996 | Nishizawa et al. . |
| 5,596,409 | 1/1997 | Marcus et al. . |

FOREIGN PATENT DOCUMENTS

| | | |
|---|---|---|
| 0145836 | 6/1985 | European Pat. Off. . |
| 0179935 | 5/1986 | European Pat. Off. . |
| 0545738 | 6/1993 | European Pat. Off. . |
| 63-222207 | 9/1988 | Japan . |
| 1747877 | 7/1992 | U.S.S.R. . |

Primary Examiner—Robert H. Kims
Attorney, Agent, or Firm—Eugene Stephens & Associates

[57] ABSTRACT

Thickness variations of semiconductor wafers are measured by interfering two beams of infrared light that are relatively modified by reflections from opposite side surfaces of the wafers. Non-null interferometric measurements are made by illuminating the wafers with diverging beams and subtracting errors caused by varying angles of incidence. Null interferometric measurements are made of both thickness variations and flatness. Infrared light, which can transmit through the wafers, is used for measuring thickness variations; and visible light, which cannot transmit through the wafers, is used for simultaneously measuring flatness.

22 Claims, 5 Drawing Sheets

INTERFEROMETER FOR MEASURING THICKNESS VARIATIONS OF SEMICONDUCTOR WAFERS

This application claims the benefit of U.S. Provisional application Ser. No. 60/018,769, filed on May 31, 1996, which provisional application is incorporated by reference herein.

TECHNICAL FIELD

The invention relates to the field of optical metrology and particularly to the use of interferometry for measuring thickness variations of semiconductor wafers.

BACKGROUND

Interferometry is used in the testing of semiconductor wafers to provide measures of flatness and thickness variations. Generally, the opposite side surfaces of the wafers are both measured for flatness, and the two flatness measures are compared to determine variations in thickness. Of the two, the measurement of thickness variations is of most importance because the semiconductor wafers, which have a very high aspect ratio of diameter to thickness, tend to conform to their mounts.

Semiconductor materials, such as silicon and gallium arsenide, are generally not transmissive within the visible spectrum. However, the opposite side surfaces of some semiconductor wafers are highly polished so that both side surfaces can be measured by reflecting a test beam from each surface and by combining the reflected test beam with a reference beam to produce an interference pattern representative of surface variations.

One available technique using a single interferometer measures one side surface at a time. Between measures, the semiconductor wafer is remounted. Each mounting can cause distortions in the shape of the semiconductor wafer, which reduces accuracy of both flatness measurements as well as the calculated thickness variations. The remounting is also time consuming.

Another available technique measures both side surfaces simultaneously using two interferometers. Although mounting distortions can still affect the flatness measurements, the relative measure of thickness variations is largely independent of the mounting. However, the positions of the two interferometers must be exactly known with respect to the mounting. Also, the two interferometers are expensive and difficult to maintain in the exactly known positions.

U.S. Pat. No. 4,653,922 to Järisch et al. discloses an interferometer that includes an arrangement of reflective optics for traversing both side surfaces of "non-transparent" wafers with a single test beam. Any variation in the optical path length of the test beam with respect to a reference beam is interpreted as a variation in thickness. One embodiment combines two flat mirrors with a diffraction grating for guiding the test beam, and another embodiment substitutes a folding mirror for the grating. All of these reflective optics are quite large and cumbersome to position in required alignment.

These and other problems with known interferometric techniques for measuring semiconductor wafers are made worse by the increasing size of these wafers, which now measure as much as 30 cm in diameter. One embodiment of Järisch et al.'s interferometer requires mirrors two to three times the wafer diameter, which is impractical for such large wafers.

SUMMARY OF INVENTION

Polished semiconductor wafers exhibit unique qualities of reflectivity and transmissivity within the infrared spectrum, and I have discovered that these qualities enable the opposite side surfaces of the wafers to be compared by new interferometric configurations. In fact, it is possible to compare the two surfaces with interferometric techniques that would not be possible with similar plane-parallel objects made of optical glass.

My invention in one or more of its embodiments exploits this discovery by simplifying interferometric apparatus for measuring thickness variations in semiconductor wafers and by extending the practicality of interferometric thickness measurement to larger size wafers. Improvements in accuracy and efficiency are also possible by comparing both side surfaces simultaneously without requiring additional optics to convey a test beam between the two side surfaces.

An interferometer, operating within a spectrum at which the semiconductor materials are at least partially transmissive (e.g., wavelengths greater than one micron), can be used to compare the opposite side surfaces of the semiconductor wafers in either a null or a non-null condition. A light beam incident to one of the opposite side surfaces is divided into two relatively modified beams by a combination of transmission through one of the surfaces and reflections from both surfaces. At least one of the relatively modified beams is transmitted between the opposite side surfaces, and either one of the relatively modified beams is reflected from both side surfaces or each of the relatively modified beams is reflected from a different one of the opposite side surfaces. Recombining the two relatively modified beams produces an interference pattern that can be evaluated to distinguish differences between the optical path lengths of the relatively modified beams as a function of distances between the opposite side surfaces.

In the non-null condition, the optical components of my interferometer can be limited to only a point source of coherent illumination and a viewing system. A coherent light beam diverging from the point source illuminates the semiconductor wafer. One portion of the light beam transmits through the wafer and reflects from one or both side surfaces. Another portion of the light beam either transmits through the wafer or reflects from one side surface. The number of reflections performed by the two beam portions (i.e., relatively modified beams) is an even number so that both beam portions emanate from the same side surface toward the viewing system.

Preferably, the viewing system includes a viewing screen and a camera sensitive to infrared radiation focused on the viewing screen. The two beam portions illuminate the viewing screen with an interference pattern formed by differences between their optical path lengths. Some of the optical path differences between the two beam portions are a result of thickness variations in the wafer, but other of these differences are attributable to variations in the angles of incidence at which the wafers are illuminated. These latter differences can be calculated in advance and used as a frame of reference (i.e., a known non-null condition) against which the further differences due to thickness variations can be compared.

In the null condition, a collimator is used to illuminate the wafer with a light beam impinging at a constant angle of incidence. One particular arrangement aligns the point source, collimator, and viewing screen along a common optical axis. At normal incidence, one portion of the beam impinging on the wafer is transmitted directly through the wafer to the viewing screen, and another beam portion is transmitted through the wafer a total of three times by reflection off of both side surfaces before reaching the viewing screen. Thus, the optical path length difference between the two beam portions at the viewing screen is equal to the product of twice the wafer thickness times the refractive index of the semiconductor material. Any variation in thickness alters an interference pattern on the viewing screen that can be directly interpreted.

Both thickness variations and flatness of semiconductor wafers can be simultaneously measured in a null condition using two different wavelengths of light. Thickness variations are measured using a first wavelength at which the semiconductor wafer is at least partially transmissive, and flatness is measured using a second wavelength at which the semiconductor wafer is substantially opaque. Both wavelengths are reflected from the wafer. The first wavelength reflects from both side surfaces, and the two reflected portions are compared to measure thickness variations. The second wavelength is split into reference and test portions in advance of the wafer. The reference portion reflects from a reference surface and the test portion reflects from the nearest side surface of the wafer. The reference and test portions are compared to measure flatness.

The fringes recorded by the camera for either the null or non-null conditions of measurement are preferably further evaluated by modulation to obtain more accurate measures of thickness variations or flatness in the wafers. For example, either the wavelength or the relative position of the point source can be varied in a controlled manner to modulate the fringes. The modulation allows the calculation of thickness or flatness differences between adjacent points on the wafers, and the rate of fringe modulation can be used to calculate the absolute thickness.

DRAWINGS

DETAILED DESCRIPTION

Figure 1:
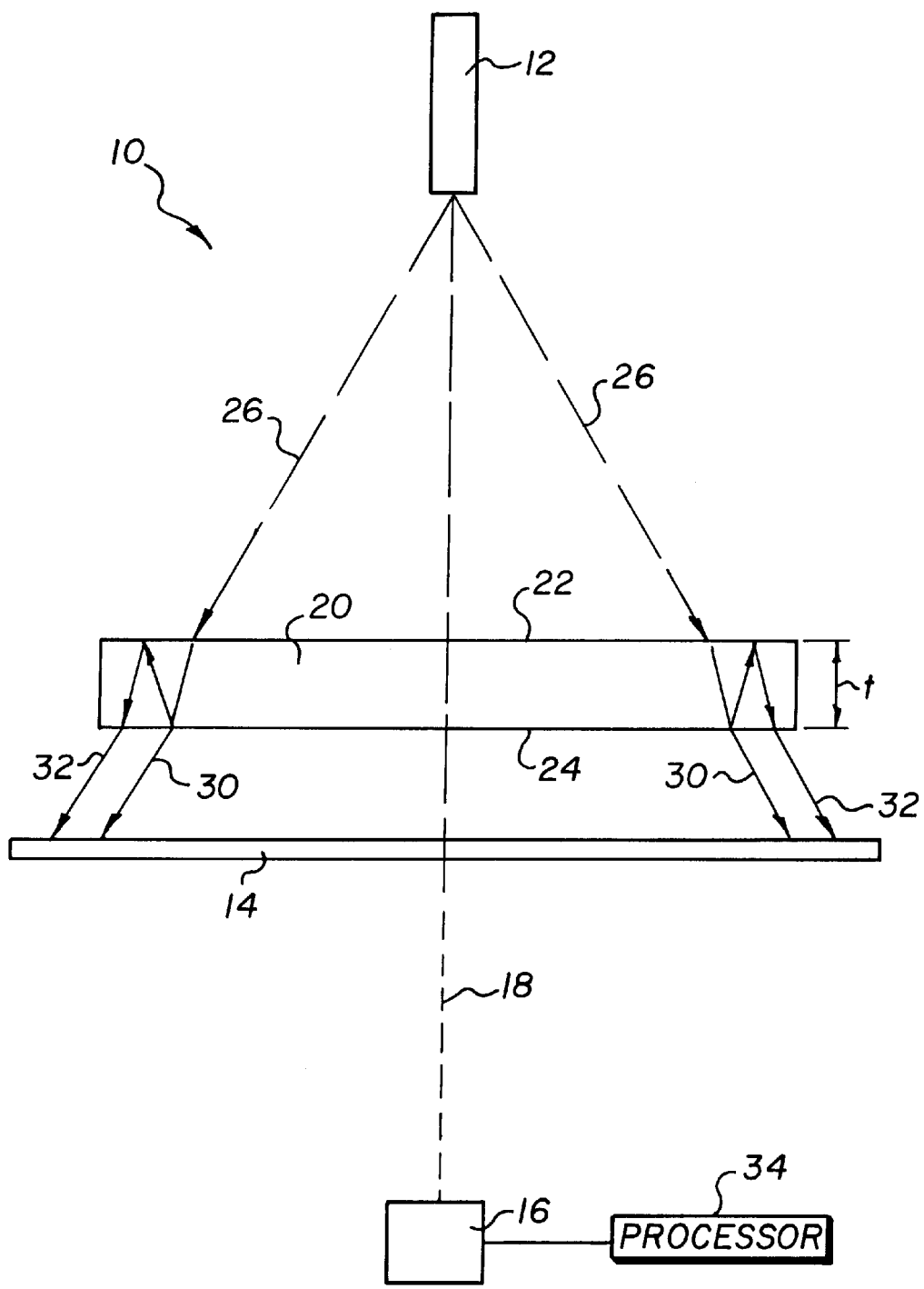
FIG. 1 is a diagram showing a first embodiment of my new interferometer in which a semiconductor wafer is viewed by transmission in a non-null condition.

An interferometer 10 depicted in FIG. 1 includes a point source 12 of coherent infrared illumination, a transmissive viewing screen 14, and a camera 16 all aligned with a common optical axis 18. A semiconductor wafer 20 under test includes a front surface 22 facing the point source 12 and a back surface 24 facing the viewing screen 14. Preferably, the wafer 20 is made from silicon or gallium arsenide, and the front and back side surfaces 22 and 24 are finely polished to at least approximate flatness and parallelism. Conventional mounting arrangements (not shown) can be used to support the semiconductor wafer 20 in the interferometer 10.

The point source 12 can be the output of a single-mode optical fiber, a tightly focused and spatially filtered laser beam, or the direct output of a laser diode. A nominally spherical wavefront 26 diverges from the point source 12 and impinges on the front surface 22 at angles of incidence that progressively increase with radial distance from the optical axis 18.

Although refracted upon entry, a portion of the diverging wavefront 26 is transmitted through the semiconductor wafer 20 to the back surface 24 where it is divided into two comparable wavefronts 30 and 32. Rays of the wavefront 30 refract from the back side surface 24 onto paths that are substantially parallel but laterally offset from the paths of their originating rays from the diverging wavefront 26. The amount of offset varies with the incident angles of the originating rays. Rays of the wavefront 32 reflect first from the back surface 24 and then from the front surface 22 before finally refracting from the back surface 24 along paths that are also substantially parallel but laterally offset in an opposite direction with respect to their originating rays from the diverging wavefront 26.

The two wavefronts 30 and 32 can be considered longitudinally sheared because they appear to diverge from imaginary points that are displaced along the optical axis 18. A pattern of interference is formed by the two wavefronts 30 and 32 on the viewing screen 14 and is recorded by the camera 16 that is sensitive to infrared light. However, in contrast to conventional interferometric practice in which a theoretically perfect test piece produces a null interference pattern, the interference pattern produced by even a perfect semiconductor wafer 20 contains a fringe pattern representing optical path length differences associated with the varying angles of incidence at which the semiconductor wafer 20 is illuminated. This non-null condition contains a fringe density that is of approximately the same order of magnitude as the fringe density expected from normal variations in wafer thickness "t" and cannot be removed by adjusting the relative position or orientation of the semiconductor wafer 20.

Nevertheless, the optical path length differences that produce the non-null interference pattern can be easily calculated by a processor 34 for each point in the recorded interference pattern and subtracted from the path length differences represented by the actual interference pattern illuminating the viewing screen 14. What remain are optical path length differences caused by differences between a theoretically perfect wafer and the actual semiconductor wafer 20. Although wafer deformations and material inhomogeneities can enter into these differences, the largest remaining differences are attributable to variations in wafer thickness "t".

Figure 2:
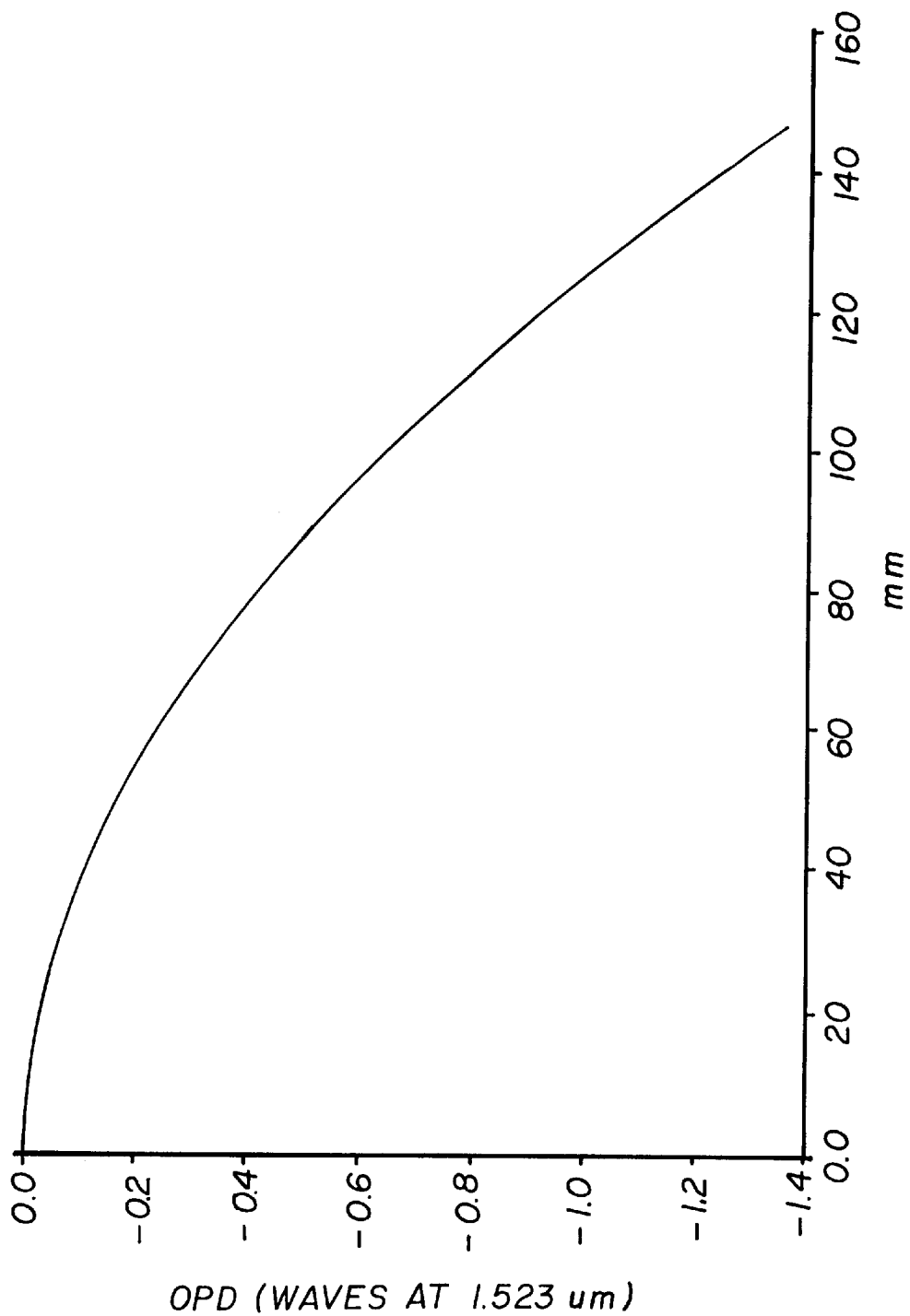
FIG. 2 is a graph showing optical path length differences caused by illuminating the semiconductor wafer with varying angles of incidence.

An example of the systematic errors attributable to the non-null condition are graphed in FIG. 2. The semiconductor wafer 20 is assumed to have a nominal thickness of 0.75 mm and a diameter of 300 mm. The point source 12 emits light having a wavelength of 1.523 $\mu$m through a numerical aperture of 0.1, and the viewing screen 14 is positioned with a 1.0 mm separation from the wafer 20. As expected, the absolute value of the optical path length difference associated with the non-null condition increases with radial distance on the viewing screen 14 from the optical axis 18.

The fringe analysis also includes conventional modulation to more accurately determine local variations in thickness. For example, either the emitted wavelength or the relative position of the point source can be varied to modulate the fringes. The rate of fringe modulation can be used to determine the absolute thickness of the wafer 20. This rate is a known function of several variables including absolute thickness, refractive index, angle of incidence, and wavelength and can be solved for absolute thickness as the only unknown.

Figure 3:
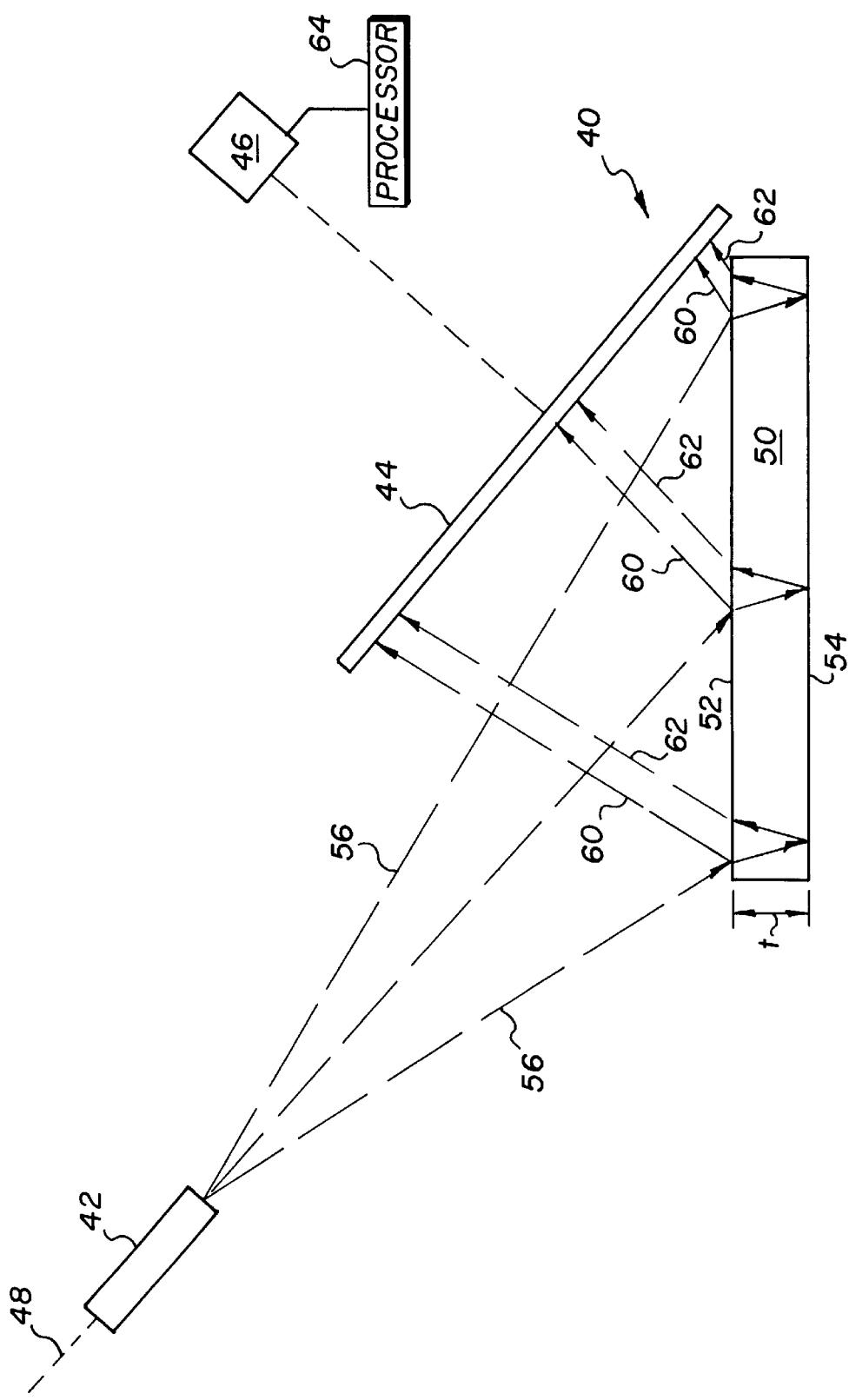
FIG. 3 is a diagram showing a second embodiment of my new interferometer in which the semiconductor wafer is viewed by reflection in a non-null condition.

Another interferometer 40 is depicted in FIG. 3. Optical components of this interferometer 40, which include a point source 42, a viewing screen 44, and a camera 46, are similar to those of the interferometer 10 but are arranged much differently. A semiconductor wafer 50 has polished front and back side surfaces 52 and 54; but in contrast to the wafer 20, the front side surface 52 faces both the point source 42 and the viewing screen 44. Also, the wafer 50 is inclined from normal incidence to rays along an optical axis 48 of the point source 42.

A diverging nominally spherical wavefront 56 emitted by the point source 42 impinges on the front surface 52 of the wafer 50 at angles of incidence that progressively vary along a diameter of the wafer 50. The diverging wavefront 56 is divided into two comparable wavefronts 60 and 62 by respective reflections from the front and back surfaces 52 and 54 of the wafer. Rays of the wavefront 60 reflect from the front surface 52 at respective angles of reflection equal but opposite to the angles of incidence formed by their originating rays from the diverging wavefront 56. Rays from the wavefront 62 refract upon entry into the wafer 50, reflect from the back surface 54, and re-refract upon exiting the wafer on paths that are parallel but laterally offset with respect to the paths of the corresponding rays of the wavefront 60.

Both of the comparable wavefronts 60 and 62 retain substantially spherical forms, but they now appear to emanate from imaginary point sources that are relatively displaced. Since the two comparable wavefronts 60 and 62 depart from each other, a non-null interference pattern is formed on the viewing screen 44 for theoretically perfect wafers.

Similar to the preceding embodiment, the optical path length differences associated with the null condition can be calculated by a processor 64 and subtracted from the optical path length differences represented by the actual interference pattern as a measure of variations in wafer thickness "t". More exact measures of thickness variations as well as a measure of absolute thickness are obtained by modulation.

The viewing screen 44, which functions as a diffuser, is preferably viewed by the camera 46 through light that is transmitted by the viewing screen 44. However, the camera 46 could also be positioned to view the screen 44 through light that is reflected by the screen 44. In addition, a fresnel lens or other focusing optic could be used in this or any of the other embodiments to collect light from the viewing screen 44 and to direct it to the camera 46.

Figure 4:
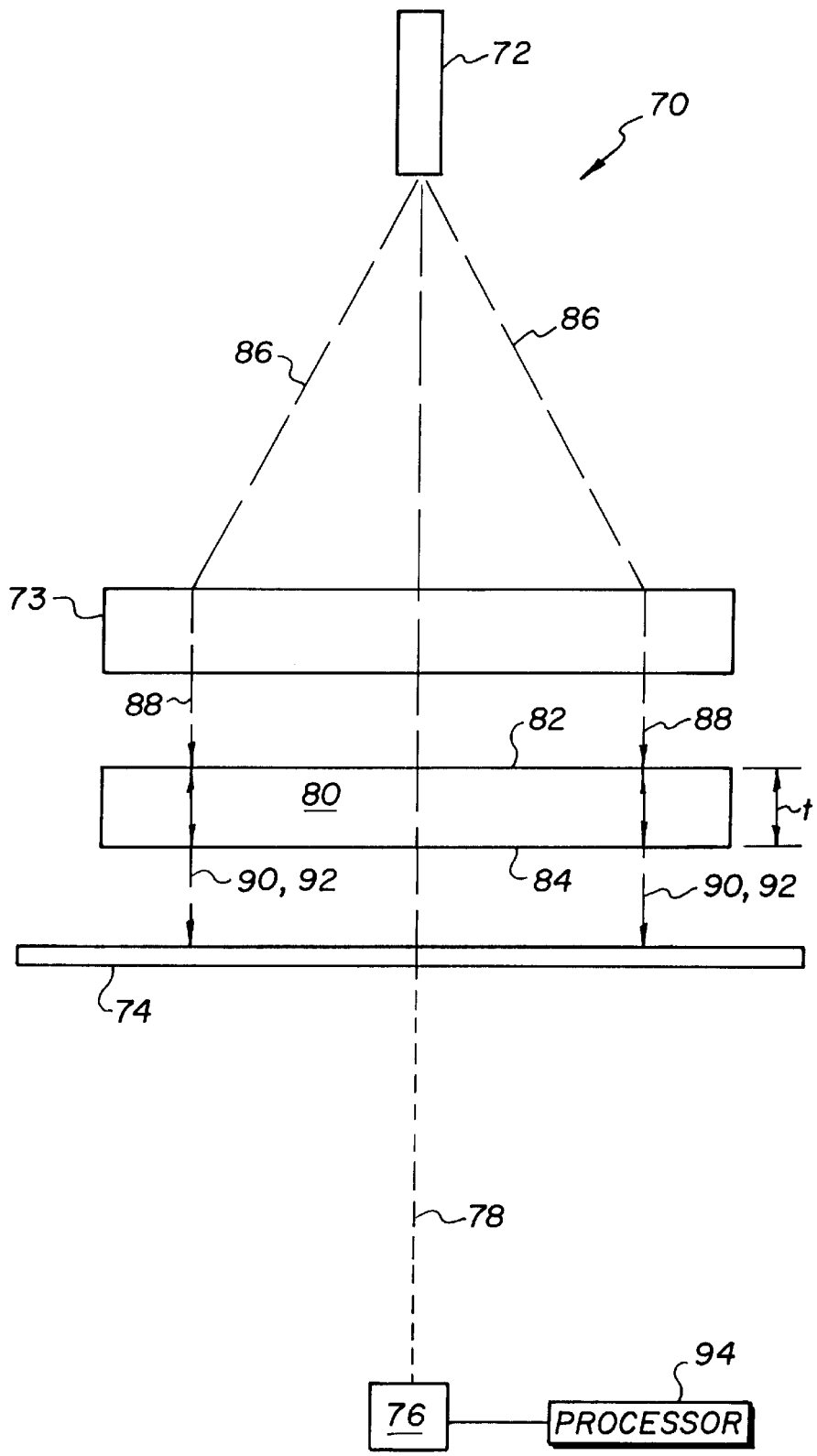
FIG. 4 is a diagram showing a third embodiment of my new interferometer in which the semiconductor wafer is viewed by transmission in a null condition.

An interferometer 70 depicted in FIG. 4 is arranged similar to the interferometer 10 but operates in a null condition. A point source 72 produces a diverging spherical wavefront 86 that is reshaped into a planar wavefront 88 by a collimator 73, which can be formed by refractive, reflective, or diffractive optics. The planar wavefront 88 illuminates a front side surface 82 of a semiconductor wafer at normal incidence. The point source 72 and the collimator 73, as well as a viewing screen 74 and a camera 76, are all preferably aligned with a common optical axis 78. However, the planar wavefront 88 could also be oriented to impinge upon the front side surface 82 at a non-normal angle of incidence while preserving a null condition.

At a back side surface 84 of the wafer 80, the planar wavefront 88 is divided into two comparable wavefronts 90 and 92. The wavefront 90 transmits directly through the second side surface 84 to the viewing screen 74. The wavefront 92 reflects first from a back side surface 84 and then again from the front side surface 82 before emanating from the back side surface 84 along substantially the same path as the wavefront 90 to the viewing screen 74. Assuming that the surfaces 82 and 84 are substantially flat, the optical path length difference between the two comparable wavefronts 90 and 92 is equal to twice the thickness of the wafer 80 times the refractive index of the semiconductor material of the wafer 80.

Thus, absent any variation in thickness "t", a null interference pattern would be expected to illuminate the viewing screen 74. A processor 94 can be used to perform a conventional evaluation of the fringes appearing on the viewing screen 74 and recorded by the camera 76. Since the interfering wavefronts 90 and 92 remain substantially collimated, it would also be possible to arrange the camera 76 to view an interference pattern on the back side surface 84 of the wafer.

The simplified interferometers of FIGS. 1 and 4 are made possible by my discovery that semiconductor wafers are both sufficiently reflective and sufficiently transmissive in the infrared spectrum to permit an interferometric comparison between a first portion of an infrared beam that is transmitted through a semiconductor wafer and a remaining portion of the infrared beam that is reflected from opposite sides of the wafer.

A sufficient contrast "C" between the two beam portions is needed to produce useful fringe patterns. Generally, this contrast should be ten percent or more as calculated by the following equation:

$$C = \frac{2\sqrt{I_1 \cdot I_2}}{I_1 + I_2} \times 100$$

where "$I_1$" is the intensity of one of the beam portions reaching the viewing screen and "$I_2$" is the intensity of the other beam portion reaching the viewing screen. However, a contrast of approximately forty percent is possible with semiconductor wafers measured in accordance with my invention.

Most transmissive optical materials including optical glass do not have an index of refraction that is sufficiently different from air to maintain a beam intensity through two reflections large enough to achieve the required contrast with a portion of the same original beam that is merely transmitted. Within the visible spectrum, semiconductor materials are not transmissive. However, beginning at wavelengths near 1 $\mu$m in the infrared spectrum, semiconductor materials such as silicon become transmissive and exhibit a sufficient index of refraction to provide the required reflectivity. The precise wavelength of infrared light can be chosen to vary the sensitivity of the measurement.

Figure 5:
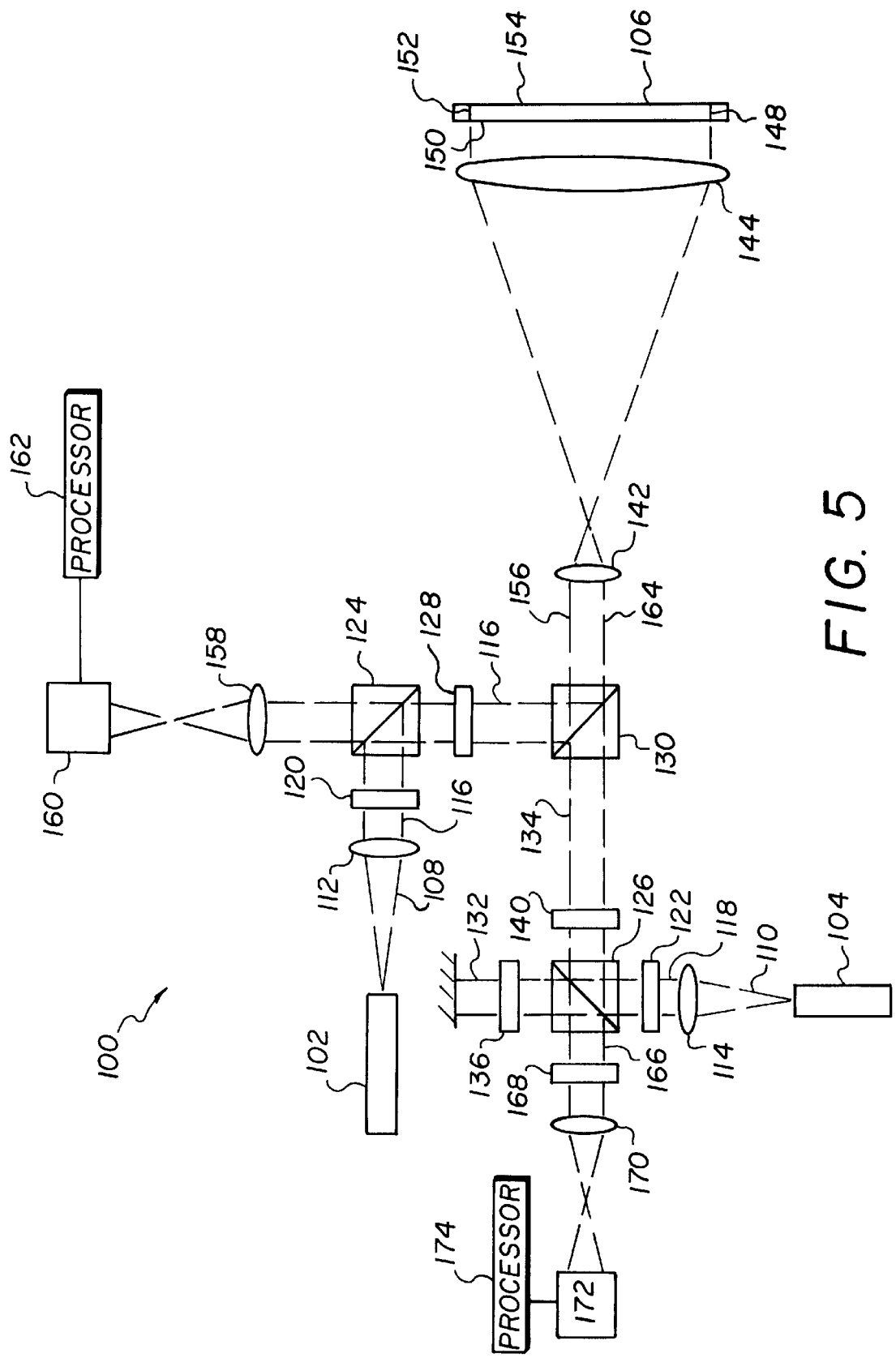
FIG. 5 is a diagram showing a fourth embodiment of my new interferometer in which two different wavelengths are used for measuring both thickness variations and flatness in a null condition.

An interferometer 100 depicted in FIG. 5, which is also arranged to operate in a null condition, includes two different point sources 102 and 104 for measuring a semiconductor wafer 106. The point source 102 is similar to the point sources of the preceding embodiments, emitting a diverging beam of light 108 having a wavelength within a range at which the semiconductor wafer 106 is at least partially transmissive. The point source 104 emits a diverging beam 110 having a wavelength at which the semiconductor wafer 106 is substantially opaque. For example, the first point source 102 can be a diode laser operating at a wavelength of 1550 nanometers, and the second point source 104 can be a HeNe laser operating at 633 nanometers.

Collimators 112 and 114 convert the diverging beams 108 and 110 into collimated beams 116 and 118, which respectively transmit through half-wave retardation plates 120 and 122 to polarizing beamsplitters 124 and 126. The half-wave retardation plate 120 is adjusted with respect to the beamsplitter 124 so that substantially all of the collimated beam 116 is reflected by the beamsplitter 124 on route through a quarter-wave retardation plate 128 to a dichroic beamsplitter 130.

The half-wave retardation plate 122 is adjusted with respect to the beamsplitter 126 to divide the collimated beam 118 into a reference beam 132 that is transmitted and a test beam 134 that is reflected. The reference beam 132 transmits through a quarter-wave retardation plate 136 to a reference mirror 138. The test beam 134 transmits through a quarter-wave retardation plate 140 to the dichroic beamsplitter 130.

The dichroic beamsplitter 130 is wavelength sensitive for reflecting the collimated beam 116 and transmitting the collimated test beam 134. Both collimated beams 116 and 134 are similarly expanded by a focusing optic 142 and a collimator 144. Together, the focusing optic 142 and the collimator 144 form a beam expander, which can be made either achromatic or spherochromatic with a focusing adjustment to accommodate the wavelength differences between the collimated beams 116 and 134. The expanded beam 116 has a wavelength that is partially transmitted and partially reflected by the semiconductor wafer 106, and the expanded test beam 134 has a wavelength that is substantially reflected by the semiconductor wafer 106.

One portion 148 of the expanded beam 116 reflects from a front surface 150 of the wafer 106, and another portion 152 transmits through the wafer 106 and reflects from a back surface 154 of the wafer 106. The two beam portions 148 and 152, which have path length differences that are a function of the wafer thickness, interfere on the front surface 150 of the wafer 106 and return to the dichroic beamsplitter 130 as a first interfering beam 156.

The quarter-wave retardation plate 128 is adjusted so the first interfering beam 156 is substantially transmitted through the beamsplitter 124. A focusing optic 158 forms an image of the interference pattern carried by the first interfering beam 156 on a recording surface of an infrared camera 160, and a processor 162 evaluates fringes of the interference pattern to measure thickness variations between the front and back surfaces 150 and 154 of the wafer 106.

The expanded test beam 134 reflects from the front surface 150 of the wafer and returns to the dichroic beamsplitter 130 as a modified test beam 164 incorporating path length variations caused by irregularities in the front surface 150. The modified test beam 164 interferes with the reflected reference beam 132 at the beamsplitter 126 forming a second interfering beam 166 that records the path length variations undergone by the test beam 134 at the front surface 150 of the wafer 106.

The two quarter-wave retardation plates 136 and 140 are adjusted to improve reflection and transmission efficiencies of the beamsplitter 126 for combining the reflected reference beam 132 and the modified test beam 164. The plates 136 and 140 also prevent light from returning to the point source 104. A polarizing plate 168 is adjusted to enhance contrast between the reference beam 132 and modified test beam 164 components of the second interfering beam 166.

A focusing optic 170 forms an image of the interference pattern carried by the second interfering beam 166 on a recording surface of a CCD camera 172. A processor 174, which can be the same processor as the processor 162, evaluates fringes of the interference pattern to measure flatness of the wafer's front surface 150. A single camera sensitive to both wavelengths of the returning beams could also be used.

Once both the flatness of front surface 150 and the thickness variations between the front and back surfaces 150 and 154 are known, the flatness of the back surface 154 can be calculated by relating both measures within a common frame of reference. Other configurations could also be used for simultaneously measuring flatness and thickness variations, including combinations in which flatness continues to be measured in a null condition and thickness variations are measured in a non-null condition as depicted in one of the first two embodiments.

Although the invention is specifically designed to work with semiconductor wafers, other nominally parallel surface test pieces made from materials meeting the recited criteria for transmissivity and reflectivity could also be measured in accordance with my invention. Variables such as incident angles and point source divergence can be optimized to suite particular applications. Also, the interferometric measurement of test surfaces under non-null conditions may be applicable to a wider range of materials, test surfaces, and types of measures.

I claim:

1. An interferometric method of measuring thickness variations of parallel-surface test pieces in a non-null condition comprising the steps of:

illuminating a first of two nominally parallel surfaces of a test piece with a non-collimated beam that strikes the first parallel surface at varying angles of incidence and that emanates from a light source located adjacent to the first parallel surface of the test piece and remote from a second of the parallel surfaces of the test piece;

using a combination of transmission through the first parallel surface and reflections from both parallel surfaces to divide the non-collimated beam into two relatively modified beams;

transmitting both of the relatively modified beams through both parallel surfaces of the test piece so that both beams emerge from the second parallel surface of the test piece remote from the light source;

reflecting one of the modified beams from both parallel surfaces of the test piece;

forming an interference pattern between the two relatively modified beams that are transmitted through the test piece including the one modified beam that reflects from both parallel surfaces of the test piece;

locating viewing optics adjacent to the second parallel surface of the test piece and remote from the light source for viewing the interference pattern; and evaluating the interference pattern to distinguish path length variations between the two relatively modified beams attributable to thickness variations from path length variations between the two relatively modified beams attributable to variations in the angles of incidence through which the first parallel surface of the test piece is illuminated.

2. The method of claim 1 in which said step of illuminating includes illuminating the first parallel surface of the test piece with a diverging beam.

3. The method of claim 2 in which said step of using divides the diverging beam into two further diverging beams.

4. The method of claim 1 in which said step of locating includes locating a viewing screen adjacent to the second of the parallel surfaces of the test piece and remote from the light source.

5. The method of claim 4 in which said step of locating includes aligning the light source, the test piece, and the viewing screen along a common optical axis.

6. The method of claim 1 in which the test piece is a semiconductor wafer that is substantially opaque at wavelengths less than one micron.

7. The method of claim 6 in which the beam emanating from the light source has a wavelength greater than one micron.

8. A method of measuring both thickness variations and flatness of parallel-surface test pieces comprising the steps of:

producing a first beam of light having a wavelength at which a test piece is substantially opaque;

producing a second beam of light having a different wavelength at which a test piece is partially transmissive;

dividing the first beam into a reference beam and a test beam;

illuminating a first of two nominally parallel surfaces of the test piece with both the test beam and the second beam;

reflecting the test beam from the first parallel surface of the test piece;

reflecting the reference beam from a reference surface;

using a combination of transmission through the test piece and reflections from both parallel surfaces to divide the second beam into two relatively modified beams;

forming a first interference pattern between the reflected reference and test beams;

forming a second interference pattern between the two relatively modified beams;

evaluating the first interference pattern to determine path length variations between the reflected reference and test beams indicative of flatness in the first parallel surface of the test piece; and evaluating the second interference pattern to determine path length variations between the two relatively modified beams indicative of thickness variations between the parallel surfaces of the test piece.

9. The method of claim 8 including the further step of combining the test beam and the second beam prior to said step of illuminating the first parallel surface of the test piece.

10. The method of claim 9 including the further step of separating the reflected test beam from the two relatively modified beams prior to said steps of forming first and second interference patterns.

11. The method of claim 8 including the further step of reflecting a first of the relatively modified beams from the first parallel surface of the test piece.

12. The method of claim 11 including the further step of transmitting a second of the relatively modified beams between the two parallel surfaces of the test piece.

13. The method of claim 12 including the further step of reflecting the second relatively modified beam from a second of the two parallel surfaces of the test piece.

14. The method of claim 8 in which said step of illuminating includes illuminating the first parallel surface of the test piece at normal incidence with both the test beam and the second beam.

15. An interferometer for measuring thickness variations of parallel-surface test pieces comprising:

a light source that produces a diverging beam of light for illuminating a first of two nominally parallel surfaces of a test piece with the diverging beam at varying angles of incidence;

said light source being located adjacent to the first parallel surface of the test piece and remote from a second of the parallel surfaces of the test piece;

a viewing screen that images an interference pattern formed between first and second portions of the diverging beam that transmit through both of the parallel surfaces of the test piece, the first beam portion being relatively modified with respect to the second beam portion by reflections from both of the parallel surfaces of the test piece;

a processor for evaluating the interference pattern to distinguish path length variations between the two relatively modified beam portions attributable to thickness variations from path length variations between the two relatively modified beam portions attributable to the varying angles of incidence at which the first surface of the test piece is illuminated;

said test piece being aligned along a common optical axis between said light source and said viewing screen; and said viewing screen being located adjacent to the second parallel surface of the test piece and remote from said light source.

16. The interferometer of claim 15 in which said light source produces a diverging beam of light having a wavelength greater than one micron.

17. The interferometer of claim 15 in which the test piece is located closer to said viewing screen than said light source.

18. An interferometer for measuring both thickness variations and flatness of parallel-surface test pieces comprising:

a first light source that produces a first beam having a wavelength at which a test piece is substantially opaque;

a second light source that produces a second beam having a different wavelength at which the test piece is partially transmissive;

a first beamsplitter that divides the first beam into a reference beam portion and a test beam portion;

a reference surface that reflects the reference beam portion;

a beam expander that directs both the test beam portion and the second beam to the test piece so that the test beam portion reflects from a first of two nominally parallel surfaces of the test piece, a first of two relatively modified portions of the second beam reflects from the first parallel surface, and a second of the two relatively modified portions of the second beam reflects from a second of the parallel surfaces of the test piece;

at least one camera for imaging a first interference pattern between the reflected reference and test beam portions of the first beam and for imaging a second interference pattern between the reflected relatively modified beam portions of the second beam; and at least one processor for evaluating the first interference pattern to distinguish path length variations between the reflected reference and test beam portions of the first beam for measuring flatness of the first parallel surface of the test piece and for evaluating the second interference pattern to distinguish path length variations between the reflected relatively modified beam portions of the second beam for measuring thickness variations between the parallel surfaces of the test piece.

19. The interferometer of claim 18 further comprising a second beamsplitter for combining the test beam portion of the first beam with the second beam in advance of said beam expander.

20. The interferometer of claim 18 in which said beam expander includes a collimator for illuminating the first parallel surface of the test piece with both the test beam and the second beam at normal incidence.

21. The interferometer of claim 18 in which said first beamsplitter also combines the test and reference portions of the first beam.

22. The interferometer of claim 18 in which said second beamsplitter separates the reflected test beam portion of the first beam from the reflected relatively modified beam portions of the second beam.

\* \* \* \* \*